No. 716,590. Patented Dec. 23, 1902.
W. C. STATE.
JOINT CLOSER FOR RUBBER TIRE SETTING MACHINES.
(Application filed May 8, 1902.)
(No Model.)
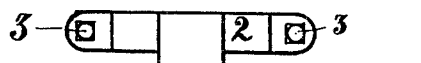
Fig. 1.
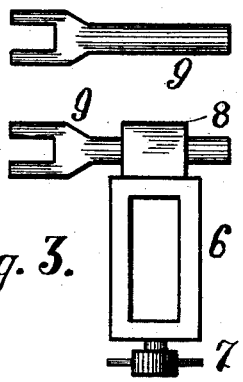
Fig. 2.
Fig. 3.
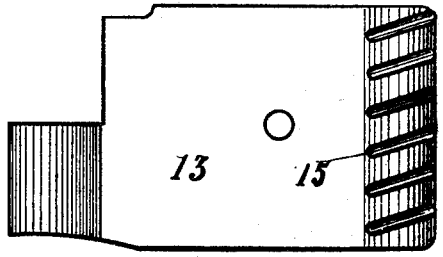
Fig. 5.
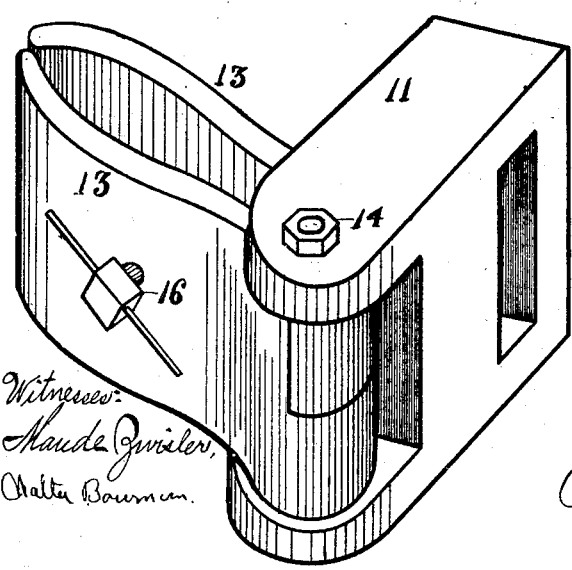
Fig. 4.
Witnesses:
Maude Gwisler
Walter Bowman
Inventor:
Will C. State,
By Humphrey & Humphrey
Attys.

UNITED STATES PATENT OFFICE.

WILL C. STATE, OF AKRON, OHIO, ASSIGNOR TO THE GOODYEAR TIRE & RUBBER COMPANY, OF AKRON, OHIO.

JOINT-CLOSER FOR RUBBER-TIRE-SETTING MACHINES.

SPECIFICATION forming part of Letters Patent No. 716,590, dated December 23, 1902.

Application filed May 8, 1902. Serial No. 106,413. (No model.)

*To all whom it may concern:*

Be it known that I, WILL C. STATE, a citizen of the United States, residing at Akron, in the county of Summit and State of Ohio, have invented a certain new and useful Improvement in Joint-Closers for Rubber-Tire-Setting Machines, of which the following is a complete specification.

My invention has relation to improvements in that class of rubber-tire-setting machines in which the tire is made straight and is afterward brought about a channeled metallic tire and its ends forced together and joined after internal longitudinal wires have been strained and their ends joined.

The principal object of my invention is to produce a new and improved machine of the class named and as incident to this to provide a new device for holding the wheel against revolution while straining the tire from one direction, which device shall be adjustable, so as to grasp a spoke close to the felly and to provide improved clamping-jaws to grasp the rubber tire, whose object will be to slightly raise the tire in the channel-tire rather than to press it into it, thereby permitting the fullness of the rubber to be more freely carried forward.

To the accomplishment of the aforesaid objects my invention consists in the peculiar and novel construction, arrangement, and combination of parts hereinafter described and then specifically pointed out in the claims, reference being had to the accompanying drawings, which form a part of this specification.

In the accompanying drawings, in which similar reference-numerals indicate like parts in the different figures, Figure 1 is an elevation of my improved machine with a wheel mounted therein and arranged for carrying forward one end of the rubber tire; Fig. 2, a detached view of the fork for engaging a spoke to hold the wheel against revolution; Fig. 3, a view of the same with its supporting-clamp; Fig. 4, an enlarged view in perspective of my improved clamping-jaws with their sliding support, and Fig. 5 an interior of one of the jaws to show its construction.

Referring to the figures, 1 is an upright bar supported at each end by centrally-offset cross-bars 2, secured by bolts 3 to any suitable support. On this bar 1 is a sliding clamp, from the front of which projects a stub-shaft 4, on which to mount the wheel, screw-threaded at its outer end and provided with a hand-nut 5, by which the wheel is retained. As this stub-shaft 5 is of the common type no detailed view has been deemed necessary. On the bar 1 is fitted to slide a carriage 6, provided with a set-screw 7, by which it may be retained at any desired point. This carriage 6 has an integral boss 8, perforated at a right angle with the opening for the bar 1 with an opening for the round arm of the retaining-fork 9. This fork has a round shank to fit the opening in the boss 8 and two arms to inclose and rest on either side of one of the spokes of the wheel.

Mounted on the stub-shaft 4 is a lever 10, its outer end being shaped to form a convenient handle for the operator to grasp. This clamping device is illustrated in Figs. 4 and 5, and it consists of a block 11, having an opening to fit and slide on the lever 10, and has at the front two perforated ears between which to mount the clamping-jaws 13. These jaws are alike, and each has a perforated lug, the two lugs being arranged to register to form a hinge, held by a pivot-bolt 14. The inner faces of these jaws are slightly inwardly curved, and in each near their free ends are a number of parallel slanting grooves 15. These jaws are compressed and held by a set-screw 16, that passes freely through one jaw and enters a screw-threaded opening in the other.

In operation the rubber tire 17, containing the wires, is placed around the wheel and the wires united by any approved means. The rubber tire is then carried forward to cover the wire-joint and unite its ends alternately from both directions. In this step the carriage 6 is moved up close to the felly and the fork 9 adjusted to receive one of the spokes, as appears in Fig. 1. The lever 10 is then rocked down past the opening in the rubber tire and the jaws clasped on the rubber tire. The lever is then forced upward, the effect of which is to carry the fullness of the tire toward the joint, which is facilitated by the grooves 15, which the compressed rubber enters and as the jaws slide on the rubber tend to raise the rubber slightly from the channeled tire. The wheel 6 is then reversed on the stub-shaft 4 and the other end of the tire is similarly brought forward, and this operation is continued until the joint is closed.

Having thus described my invention, what I claim, and desire to secure by Letters Patent, is—

1. An improved clamp for rubber-tire-setting machines consisting of two oppositely-disposed hinged jaws having in their inner faces grooves arranged diagonally with reference to the line of the tire, substantially as shown and described.

2. The combination in a machine for closing joints in tire-setting, of a duly-supported wheel-pivot, a swinging lever radial to the wheel center, a block slidable longitudinally on said lever, a pair of hinged clamping-jaws mounted on said block, grooves on the inner faces of said jaws arranged diagonally to the line of the tire and means to retain the wheel against rotation, substantially as shown and described.

3. The combination in a machine of the class designated of a pivot-supporting bar, a pivot mounted thereon for the wheel, a block mounted on said bar capable of being retained at any desired point, a fork mounted in said block to engage a spoke of the wheel, a lever pivoted on the wheel-pivot, a block on said lever, a pair of clamping-jaws hinged on said block and diagonal grooves on the working faces of said jaws, substantially as shown and described.

In testimony that I claim the above I hereunto set my hand in the presence of two subscribing witnesses.

WILL C. STATE.

In presence of—
C. E. HUMPHREY,
C. P. HUMPHREY.